United States Patent
Thompson et al.

(10) Patent No.: US 7,426,633 B2
(45) Date of Patent: Sep. 16, 2008

(54) SYSTEM AND METHOD FOR REFLASHING DISK DRIVE FIRMWARE

(75) Inventors: Mark J. Thompson, Spring, TX (US); Mark B. Harris, Houston, TX (US); Peter C. Fry, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 491 days.

(21) Appl. No.: 11/127,650

(22) Filed: May 12, 2005

(65) Prior Publication Data

US 2006/0259756 A1 Nov. 16, 2006

(51) Int. Cl.
  *G06F 15/177* (2006.01)
(52) U.S. Cl. .................. 713/2; 713/1; 713/100; 717/168; 717/172; 717/173
(58) Field of Classification Search .......... 713/1, 713/2, 100
See application file for complete search history.

(56) References Cited

U.S. PATENT DOCUMENTS

| | | | |
|---|---|---|---|
| 5,042,381 A | 8/1991 | Thompson et al. | |
| 5,623,625 A | 4/1997 | Thompson et al. | |
| 5,809,224 A | 9/1998 | Schultz et al. | |
| 5,822,584 A | 10/1998 | Thompson et al. | |
| 5,829,019 A | 10/1998 | Thompson et al. | |
| 5,961,652 A | 10/1999 | Thompson | |
| 6,058,489 A | 5/2000 | Schultz et al. | |
| 6,092,169 A | 7/2000 | Murthy et al. | |
| 6,101,559 A | 8/2000 | Schultz et al. | |
| 6,179,492 B1 * | 1/2001 | Guy et al. | 717/169 |
| 6,237,091 B1 | 5/2001 | Firooz et al. | |
| 6,266,809 B1 | 7/2001 | Craig et al. | |
| 6,341,342 B1 | 1/2002 | Thompson et al. | |
| 6,357,021 B1 | 3/2002 | Kitagawa et al. | |
| 6,467,087 B1 | 10/2002 | Yang | |
| 6,505,278 B1 * | 1/2003 | Piwonka et al. | 711/162 |
| 6,546,457 B1 * | 4/2003 | Don et al. | 711/114 |
| 6,609,145 B1 | 8/2003 | Thompson et al. | |
| 6,640,334 B1 | 10/2003 | Rasmussen | |
| 6,675,258 B1 * | 1/2004 | Bramhall et al. | 711/114 |
| 6,694,479 B1 | 2/2004 | Murthy et al. | |
| 6,708,231 B1 * | 3/2004 | Kitagawa | 710/10 |
| 6,728,833 B2 * | 4/2004 | Pruett et al. | 711/114 |
| 6,754,828 B1 | 6/2004 | Marisetty et al. | |
| 6,754,895 B1 | 6/2004 | Bartel et al. | |
| 6,772,310 B2 | 8/2004 | Thompson et al. | |
| 7,197,634 B2 * | 3/2007 | Kruger et al. | 713/1 |
| 2002/0065984 A1 | 5/2002 | Thompson et al. | |
| 2002/0114384 A1 | 8/2002 | Nelson et al. | |
| 2003/0066062 A1 | 4/2003 | Brannock et al. | |
| 2003/0236944 A1 | 12/2003 | Thompson et al. | |
| 2004/0025779 A1 | 2/2004 | Pharo et al. | |

(Continued)

FOREIGN PATENT DOCUMENTS

EP 0402683 12/1998

*Primary Examiner*—Nitin C Patel

(57) ABSTRACT

There is provided a system and a method for reflashing disk drive firmware. Specifically, there is provided a method comprising storing a firmware flash image in a storage area on a disk drive, initiating power-on self test operations for the computer, and reflashing firmware associated with the disk drive using the firmware flash image stored on the disk drive, wherein the reflashing occurs during the power-on self test operations.

24 Claims, 5 Drawing Sheets

U.S. PATENT DOCUMENTS

| | | |
|---|---|---|
| 2004/0030877 A1 | 2/2004 | Frid |
| 2004/0049632 A1 | 3/2004 | Chang et al. |
| 2004/0054883 A1 | 3/2004 | Goodman et al. |
| 2004/0054995 A1 | 3/2004 | Lee et al. |
| 2004/0076043 A1 | 4/2004 | Boals et al. |
| 2004/0083469 A1 | 4/2004 | Chen et al. |
| 2004/0139357 A1 | 7/2004 | Lee et al. |
| 2005/0055595 A1 | 3/2005 | Frazer et al. |
| 2005/0262390 A1* | 11/2005 | Okamoto et al. ............... 714/6 |

* cited by examiner

SYSTEM AND METHOD FOR REFLASHING DISK DRIVE FIRMWARE

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

One of the most widely used forms of data storage in modern computers is the disk drive. Disk drives store information on a media, such as a magnetic disk, an optical disk, or a magnetic tape. When information is requested by a user, the computer may send a request to a disk drive controller which accesses the disk drive and retrieves the requested information. As the storage capacity of disk drives, especially hard disk drives, has increased, the disk drives themselves have become more sophisticated. As such, many disk drives now resemble simple computers rather than just data storage components. For example, many hard disk drives now include central processing units and read only memories ("ROM"), often referred to as firmware, that control the disk drive's internal hardware and data access.

In many disk drives, the instructions stored on the firmware can be updated or replaced through a process known as "reflashing." Reflashing can be employed to change the way the disk drive functions. For example, the firmware of a hard disk drive can be reflashed with updated instructions that may enable the hard disk drive to function more efficiently. Conventionally, reflashing a disk drive involved turning off the computer system, rebooting the computer system with a specialized operating system stored on a compact disc, executing a reflashing utility on the computer system, and then rebooting the computer system back to its normal operating system. This series of events may take several minutes per disk drive to complete. During this time, the computer system may be unable to perform its primary function (i.e., the computer system may be off-line or "down"). For a computer system employing tens, hundreds, or more disk drives, the cumulative "downtime" to reflash the disk drives can be relatively long. Moreover, rebooting the computer system with a specialized operating system may require the computer system to have a compact disc drive or may require physical access to the computer system. These restrictions can limit or prevent reflashing of disk drives coupled to computer systems without dedicated access consoles (e.g., "headless servers", such as blade servers).

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The exemplary embodiments described below are directed towards a system or a method for reducing system downtime while reflashing disk drive firmware. For example, in one embodiment, a host computer is configured to store a new or updated firmware flash image along with instructions for reflashing the disk drive firmware on a reserved storage area within the disk drive. During the next reboot of the host computer, a disk drive controller coupled between the host computer and the disk drive may be configured to reflash the disk drive firmware with the new firmware flash image. In this way, the disk drive firmware can be reflashed upon the next routine reboot of the host computer system without having to reboot to a specialized operating system and without having physical access to the host computer system.

Figure 1:
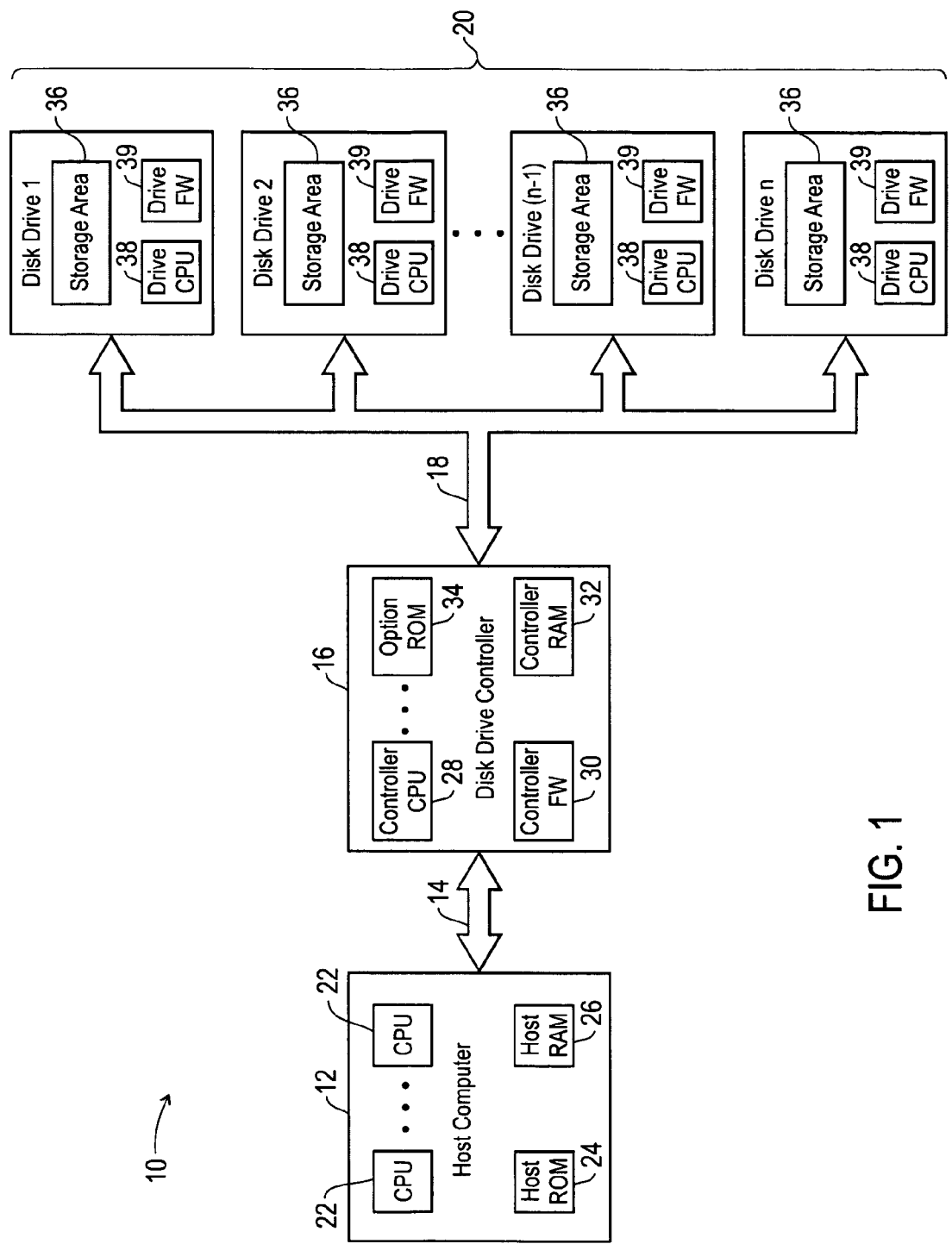
FIG. 1 is a block diagram of an exemplary computer system configured to reduce system downtime to reflash disk drive firmware in accordance with an exemplary embodiment of the present invention.

Turning initially to FIG. 1, a block diagram of an exemplary computer system configured to reduce system downtime while updating disk drive firmware in accordance with an exemplary embodiment is illustrated and generally designated by a reference numeral 10. In one embodiment, the computer system 10 is a modified version of the ProLiant DL 380 Package Cluster with MSA 1000 manufactured by Hewlett Packard Corporation. The computer system 10 may include a host computer 12, a controller interface 14, a disk drive controller 16, a disk drive interface 18, and a plurality of disk drives 20.

The host computer 12 may include one or more central processing units ("CPU") 22. The CPUs 22 may be any suitable number of physical or logical CPUs, such as the Intel Pentium IV Processor or the Intel Xeon Processor. The CPUs 22 may be configured to execute instructions stored on a host Read Only Memory ("ROM") 24 or a host Random Access Memory ("RAM") 26. For example, in one embodiment described further below, the CPUs 22 may execute instructions stored on the host RAM 26 to copy an update request package to one of the disk drives 20.

The host computer 12 may be coupled to the disk drive controller 16 via the controller interface 14. The controller interface 14 may be any suitable form of computer interface.

For example, the controller interface 14 may be a PCI interface, a PCI-X interface, a PCI Express interface, a Fibre channel interface, a fiber optic interface, a Small Computer System Interface ("SCSI"), an Ethernet interface, a Universal Serial Bus ("USB") interface, a Firewire interface, a Fibre-SCSI interface, a Serial Advance Technology Attachment ("SATA") interface, a Serial Attached SCSI ("SAS") interface, and so forth.

The disk drive controller 16 is configured to control the communication between the host computer 12 and the disk drive 20. For example, the disk drive controller 16 may receive data requests from the host computer 12, retrieve the requested data from one of the disk drives 20, and then communicate the requested data back to the host computer 12. The disk drive controller 16 may be any one of a variety of suitable disk drive controller types. For example, the disk drive controller 16 may be a redundant array of inexpensive disks ("RAID") controller configured to control a RAID within the disk drive 20.

As described above, the disk drive controller communicates with the host computer over the controller interface 14. As such, the disk drive controller 16 is configured to employ the same interface types as the controller interface 14. For example, if the controller interface 14 is a PCI interface, the disk drive controller 16 will be a PCI or PCI-compatible card or device. While the disk drive controller 16 is illustrated in FIG. 1 as being separate from the host computer 12, those of ordinary skill in the art will appreciate that the disk drive controller may also be installed within or integrated into the host computer 12. For example, the disk drive controller 16 may be a PCI computer card installed within the host computer 12. Alternatively, the disk drive controller may be located within a separate chassis and coupled to the host computer 12 via the controller interface 14.

The disk drive controller 16 includes a controller CPU 28, controller firmware ("FW") 30, controller RAM 32, and a controller option ROM 34. In one embodiment, the controller CPU 28 is configured to execute instructions stored on either the controller firmware 30 or the controller RAM 32 to transfer data to, perform maintenance on, or test the disk drives 20. For example, the controller CPU 28 may be configured to execute instructions stored in the controller firmware 30 to reflash disk drive firmware 39 located on each of the disk drives 20. Those of ordinary skill in the art will appreciate that because the disk drive controller 16 includes the controller CPU 28, the disk drive controller 16 is able to reflash the drive firmware 39 on each of the disk drives 20 without instructions to do so from the host computer 12. In other words, the disk drive controller 16 can be configured to operate in an operating system independent manner.

The disk drive controller 16 also contains the option ROM 34. Those of ordinary skill in the art will appreciate that the option ROM 34 may store instructions that enable the host computer 12 to interface with the disk drive controller 16. Accordingly, in one embodiment described further below, the host computer 12 may copy the instructions stored on the option ROM 34 into the host RAM 26 and then execute those instructions to set up or enable communications between the host computer 12 and the disk drive controller 16. It will also be appreciate that a single disk drive controller 16 is illustrated in FIG. 1 for exemplary purposes only and that, in alternate embodiments, any suitable number of disk drive controllers 16 with any suitable number of corresponding disk drive interfaces 18 and disk drives 20 may be included in the computer system 10.

The disk drive controller 16 may be coupled to the disk drive 20 via the disk drive interface 18. The disk drive interface 18 may be any suitable disk drive interface including, but not limited to, the interface types described above in regard to the controller interface 14. As illustrated, the computer system 10 may also include n number of the disks drives 20. Each of the disk drives 20 may include an information storage area 36, a drive CPU 38, and the disk drive firmware 39. As described above, the drive CPU 38 may employ the drive firmware 39 to control hardware within each of the disk drives 20 to control and optimize data access of the storage area 36. As will be described in greater detail below, in one embodiment, the host computer 12 may store an update request package comprising a firmware flash image and instructions for reflashing a particular one of the disk drives 20 within a reserved area of the storage area 36.

The disk drives 20 may be any suitable form of disk drive. For example, in one embodiment, the disk drives 20 are hard disk drives, such as a Ultra320 300 gigabyte SCSI hard drive produced by Hewlett Packard. In alternate embodiments, the disk drives 20 may be SAS hard drives, SATA hard drives, Integrated Drive Electronics ("IDE") hard drives, tape drives, optical drives, or other suitable forms of storage. As described above, in one embodiment, the disk drives 20 may be configured as a RAID to provide error tolerant, redundant data storage. Configuring the disk drives as a RAID can minimize data loss due to a disk drive malfunction. For example, many RAID schemes enable full data recovery if one or even two disk drives from a RAID set malfunction. Further, in one embodiment, the plurality of disk drives 20 may be housed in separate enclosures or locations. For example, the disk drives 20 may include two RAID sets, each of which is contained in a separate enclosure.

Figure 2:
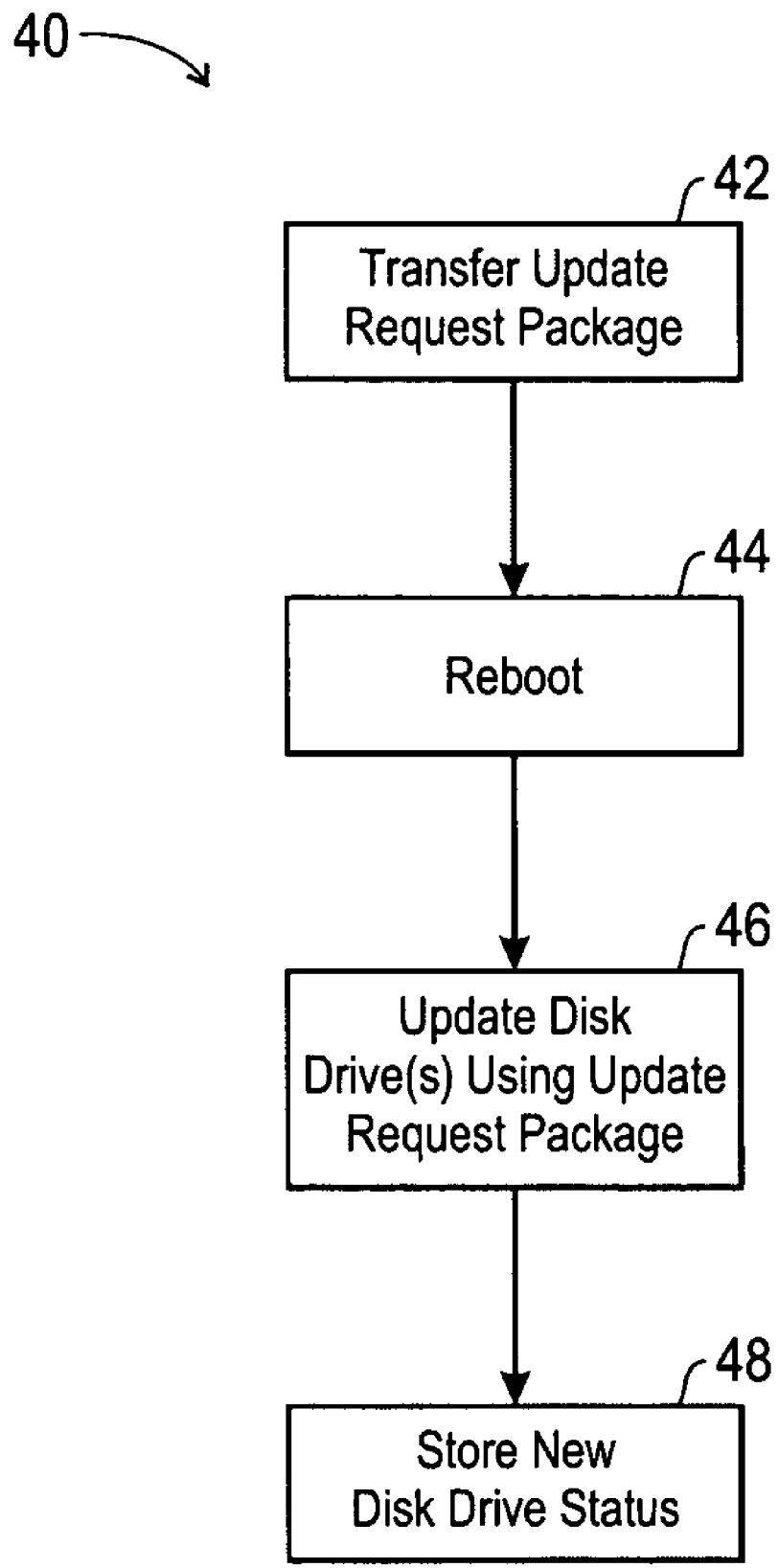
FIG. 2 is a flow chart illustrating an exemplary technique for reducing system downtime to reflash disk drive firmware in accordance with an exemplary embodiment of the present invention.

As described above, embodiments of the present technique facilitate reducing the downtime of a host computer system to reflash the disk drive firmware 39. Accordingly, FIG. 2 is flowchart illustrating an exemplary technique 40 for reducing system downtime while updating the disk drive firmware 39 in accordance with one embodiment. In this embodiment, the host computer 12 is configured to perform the technique 40. As indicated by block 42, the technique 40 begins by transferring the update request package from the host computer 12 to any of the disk drives 20 that qualify under certain predetermined criteria, as will be described further below. In one embodiment, the host computer 12 may be configured to download the update request package from an internet web server. After transferring each update request package, the host computer 12 may amend each transferred update request package to indicate that a firmware update (i.e., a reflash) is pending.

Once the update request packages have been transferred, the computer system 10 may be rebooted or restarted, as indicated in block 44. In one embodiment, the computer system 10 is rebooted immediately following the transfer of the update requests packages, while in another embodiment, the rebooting may occur at a later time for reasons unrelated to the firmware update. For example, the host computer 12 may be rebooted several days after the update request package transfers during the installation of an unrelated software program.

While the computer system 10 is booting or executing a power-on self test ("POST"), the disk drives 20 may be reflashed using the transferred update request package, as indicated by block 46. As will be described in greater detail below, the disk drive controller 16 may reflash the disk drives 20 that have an update request package that indicates a pending update. In another embodiment, however, each of the disk drives 20 may be configured to determine for itself whether it has a pending update and to reflash its own disk drive firmware 39 automatically if there is a pending update. Those of ordinary skill in the art will appreciate that the power-on self test ("POST") operations of the host computer 12 may be paused during the reflashing process to enable the disk drives 20 to be reflashed without data requests or other interference from the host computer 12.

After the reflashing process is complete, the disk drive controller (or the disk drive) may store status information, such as whether the reflashing was successful and what version of firmware is currently installed on the disk drive firmware 39, as indicated by block 48. As will be described in greater detail below, in one embodiment, storing the status information includes updating the update request package stored on each of the disk drives 20 to include the new firmware version and the time and date of the reflash. Moreover, if the firmware update was unsuccessful or aborted, the status information may also include information related to the reflashing errors or the cause of the abort. After the status information has been stored, the host computer 12 may resume POST operations, finish booting up, and resume normal operation.

Figure 3:
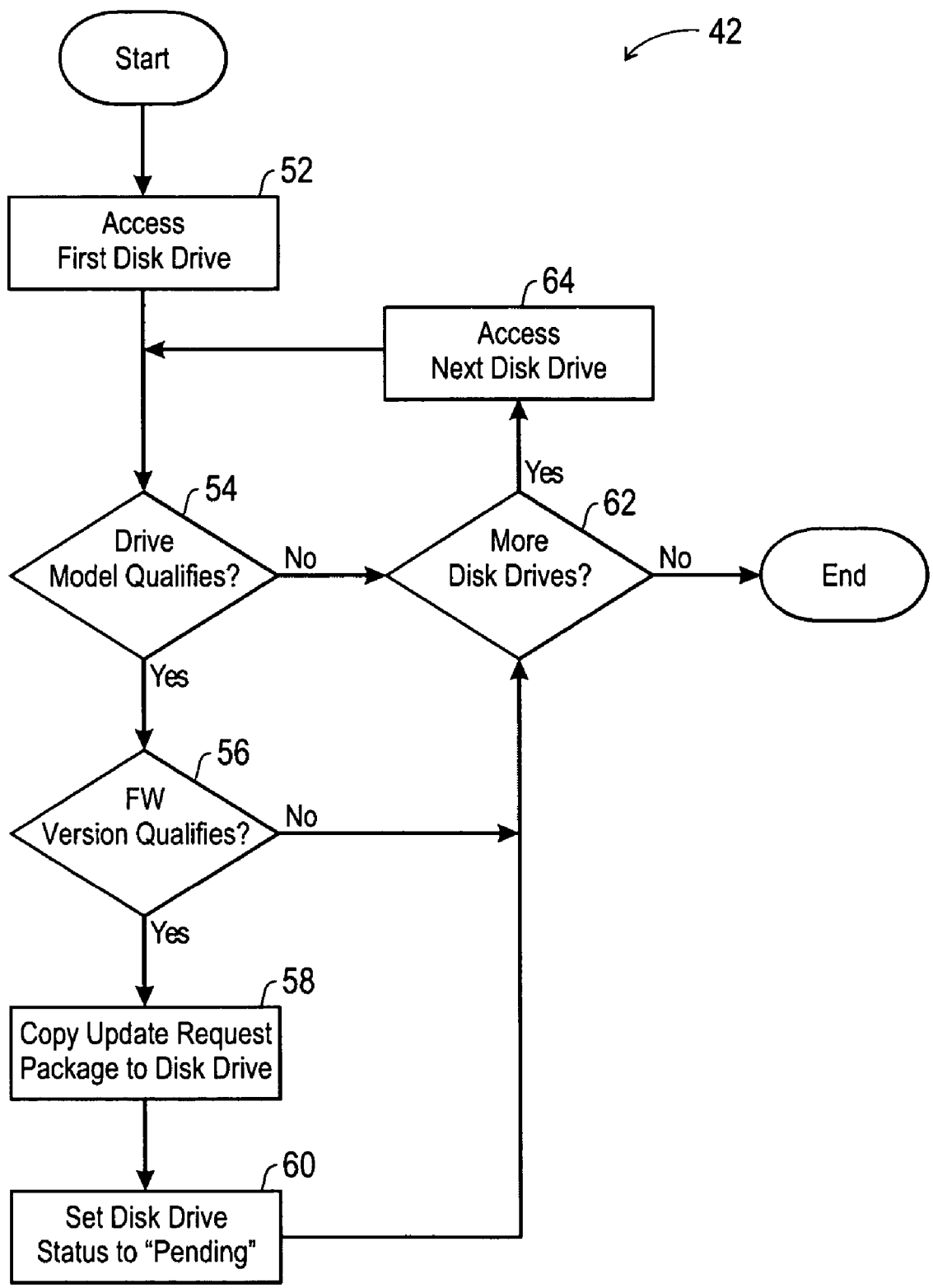
FIG. 3 is a more detailed flow chart illustrating an exemplary technique for transferring an update request package in accordance with an exemplary embodiment of the present invention.

Turning next to FIG. 3, a more detailed flowchart illustrating the exemplary technique 42 for transferring update request packages in accordance with an embodiment is illustrated. In one embodiment, the technique 42 may be executed by a host computer 12 using a software program running on the host RAM 26. In another embodiment, the software to perform the technique 42 may be stored on one of the disk drives 20 and loaded into the host RAM 26 via the disk drive controller 16.

As indicated by block 52, the technique 42 begins by accessing a first disk drive within the plurality of disk drives 20. Those of ordinary skill in the art will appreciate that the first disk drive may identified using any suitable physical or logical disk drive order or arrangement. Once the first disk drive has been accessed, the host computer 12 may query the disk drive to determine whether the first disk drive qualifies to be reflashed. This query is performed because the update request package may include a firmware flash image that is specific to a single model or single manufacturer of disk drives, but the plurality of disk drives 20 may include a disk drives produced by one or more disk drive manufacturers. As such, before transferring the update request package to the first disk drive, the host computer 12 ensures that the first disk drive qualifies to be reflashed. In one embodiment, the host computer 12 determines whether the first disk drive qualifies for reflashing by determining whether the model number of the first disk drive is one of the qualifying model numbers stored on the host computer 12, as indicated in block 54. Those of ordinary skill in the art will appreciate that model number is merely one example of a suitable qualifying feature for the disk drives 20. In alternate embodiments, different identification parameters, such as size, serial number, manufacturer, and so forth may be employed in place of or in addition to disk drive model numbers.

If the model number of the first disk drive does not qualify (i.e., the model number is not one of the model numbers or range of model numbers that is intended to be reflashed), the technique 42 may continue to block 62, as will be discussed further below. If the model number of the first disk drive does qualify, the first computer 12 may next determine whether the firmware version currently installed on the first disk drive is one of the firmware versions that is intended to be reflashed, as indicated by bock 56. Block 56 is included in the technique 42 to ensure disk drives that have already been reflashed or do not need to be reflashed are not reflashed. However, in alternate embodiments, the first computer 12 may be configured to update the disk drive firmware 39 regardless of the version of firmware that is currently loaded on the disk drive firmware 39. Returning to block 56, if the firmware version does not qualify, the technique 42 proceeds to block 62, which will be discussed in greater detail below.

If the firmware version does qualify the host computer 12 may copy the update request package to the first disk drive, as indicated by block 58. In one embodiment, while the host computer is copying the update request package to the first disk drive, a disk drive status indicator within a local copy of the update request package may be set to a "loading" state to indicate that the update request package is being copied. As will be discussed in greater detail below, the update request package contains a new or updated firmware flash image and instructions and other information to reflash the disk drives 20 with the firmware flash image. After the update request package has been copied to the first disk drive, the host computer 12 may set a disk drive status indicator within the update request package to a "pending" state, as indicated by block 60. As will be described further below, in one embodiment, a pending state identifies the disk drives that should be reflashed by the disk drive controller 16 during the next reboot.

Lastly, after the status of the first disk drive has been set to pending, the first computer 12 will determine whether there are any more disk drives within the plurality of disk drives 20 that have not yet been accessed, as indicated in block 62. If there are additional disk drives that have not been accessed, the host computer 12 may access the next disk drive within the physical or logical order, as indicated by block 64. However, if there are no more disk drives that have not been accessed, the technique 42 may terminate.

Figure 4:
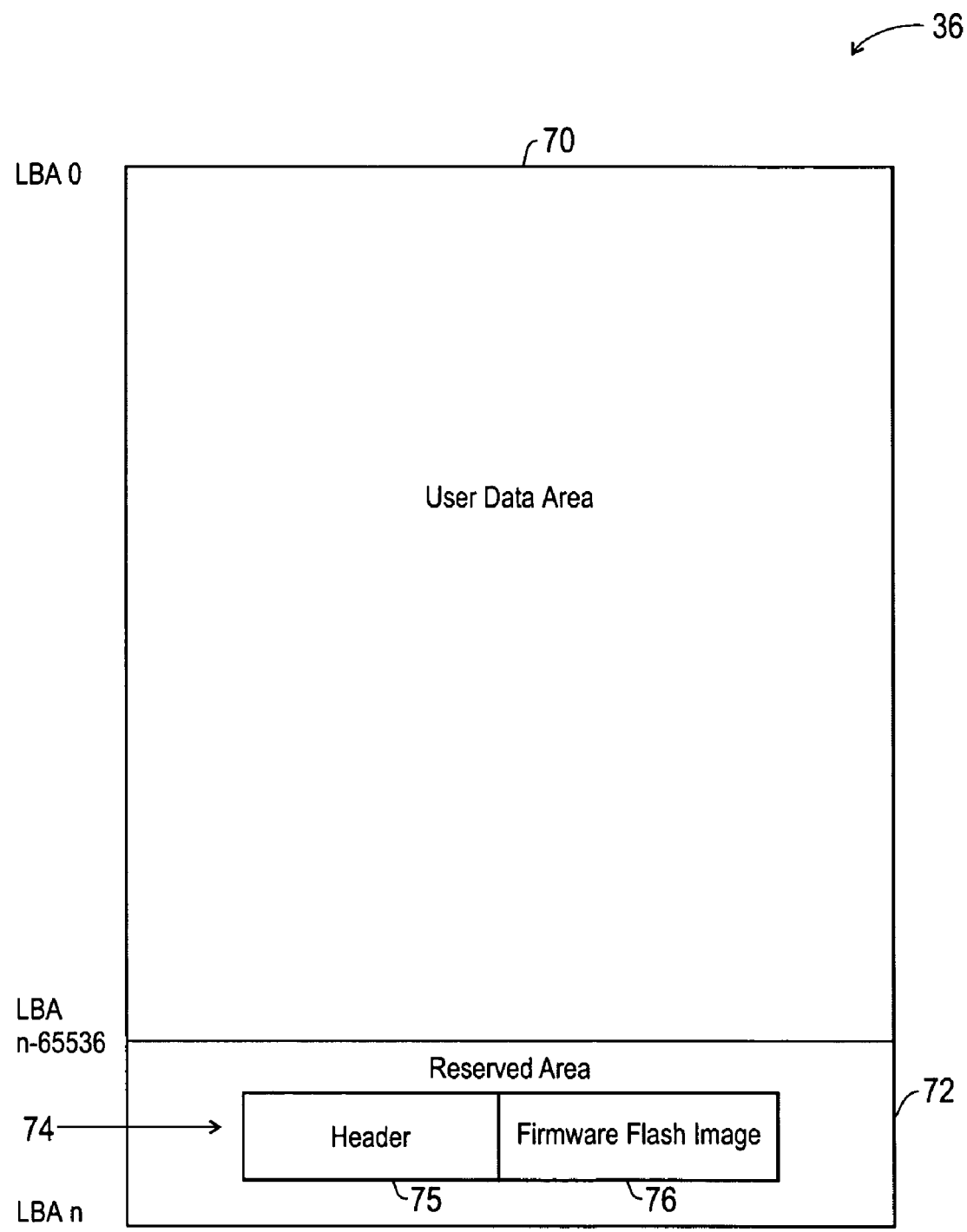
FIG. 4 is a block diagram of an exemplary disk drive storage area configured to reduce downtime to reflash disk drive firmware in accordance with an exemplary embodiment of the present invention.

As described above, the host computer 12 may be configured to copy the update request package to one or more of the disk drives 20. FIG. 4 is a block diagram of an exemplary disk drive storage area 36 configured to reduce downtime while updating disk drive firmware in accordance with an embodiment. As illustrated, the disk drive storage area 36 may be subdivided into a user data area 70 and a reserve area 72. In one embodiment, the user data area begins at a logical block address ("LBA") zero and extends until 65,536 logical blocks from the last block address n in the storage area 36. In this embodiment, the reserve area 72 contains 65, 536 logical blocks of 512 bytes each or 32 megabytes ("MB") of storage. In alternate embodiments, the reserve area may be designated to occupy virtually any suitable unused area of storage within the storage area of 36. For example, in one alternate embodiment, the reserved area 72 may occupy a suitable number of sectors on an IDE hard disk drive.

As illustrated in FIG. 4, the reserve area 72 may store an update request package 74. The update request package 74 may include a header 75 which stores information and instructions to reflash the disk drive firmware 39 and a firmware flash image 76 that is copied into the disk drive firmware 39 when the disk drive firmware 39 is reflashed. As will be described in greater detail below, the disk drives 20 may be configured to maintain the update request package 74 and the reserve area 72 even after a reflash to provide a storage location for status information.

As stated above, the header 75 of the update request package 74 may include information and instructions to facilitate reflashing of the disk drive firmware 39. In one embodiment, the header includes a plurality of data structures that each contains a plurality of fields that are configured to store information related to reflashing the disk drive firmware 39. Specifically, in one embodiment, the header may include a "signature" data structure that includes fields that may contain a signature code that the disk drive controller 16 can use to determine that the reserved area 72 actually contains the update request package 74 and not just other data. The signature data structure may also contains fields that contain cyclic redundancy check ("CRC") bits and fields that contain the sizes and offsets for the other data structures in the header 75 as well as the size and offset for the firmware flash image 76.

The header 75 may also include a "status" data structure that contains the status of the last update, and upon a failure, error information. Specifically, the status data structure may include a status field that contains the status of the reflashing process. For example, the status field may contain a writing indicator, a pending indicator, a completed indicator, an error indicator, a running indicator, a paused indicator, or an abort indicator. The status data structure may also include fields related to the request time of a reflash request, the time that the last reflash occurred, and the old (pre-reflash) version of the firmware. In the event of reflashing error, the status data structure may also contain an offset to the instruction that caused the error.

The header 75 may also include a "request" data structure that contains information related to the update request itself. For example, the request data structure may include vendor identification, product identification, serial numbers, or other qualifying information that can be used by the host computer 12 to identify the disk drives 20 that qualify for reflashing. The request data structure may also contain field that contain flags to allow adjustment of the update process. For example, in one embodiment, the request data structure includes a flag that indicates that reflashes the disk drive firmware 39 regardless of the firmware version already installed.

The request data structure may also include fields that contain the instruction count (i.e., the number of instructions to reflash the disk drive firmware), the size of each of the instructions, and the actual sequence of reflashing instructions themselves. Those of ordinary skill in the art will appreciate that the actual reflashing instruction may include instructions to either the disk drives 20 or the disk drive controller 16 or both. Accordingly, the precise structure of each instruction will vary depending on the type of the disk drive and the type of disk drive controller 16.

In one embodiment, the instructions themselves may be either SCSI instructions or controller instructions. In this embodiment, a SCSI instruction may take the form illustrated in Table 1.

TABLE 1

| Offset | Name | Size | Value |
| --- | --- | --- | --- |
| 0 | Tag | 1 | 0x53 |
| 1 | Timeout | 1 | |
| 2 | Flags | 2 | |
| 4 | SCSI Parameter Flags | 4 | |
| 8 | Data Offset | 4 | |
| 12 | Data Length | 4 | |
| 16 | Repeat Count | 2 | |
| 18 | Repeat Delay | 2 | |
| 20 | Key | 1 | |
| 21 | ASC | 1 | |
| 22 | ASQ | 1 | |
| 23 | CDB Length | 1 | 6, 10, 12, 16 |
| 24 | SCSI CDB | 16 | | and a controller instruction may take the form illustrated in Table 2.

TABLE 2

| Offset | Name | Size | Value |
| --- | --- | --- | --- |
| 0 | Tag | 1 | 0x43 |
| 1 | Timeout | 1 | |
| 2 | Flags | 2 | |
| 4 | Reserved | 4 | 0 |
| 8 | Data Offset | 4 | 0 |
| 12 | Data Length | 4 | 0 |
| 16 | Repeat Count | 2 | |
| 18 | Repeat Delay | 2 | |
| 20 | Reserved | 3 | |
| 23 | Command Length | 1 | 6, 10, 12, 16 |
| 24 | Controller Command | 16 | | where the tag field identifies the instruction as a SCSI instruction (0x53) or a controller instruction (0x43); timeout is the number of seconds before a command times out; the flags control the execution of the instruction; the data offset and length specify the offset into the data area and the number of bytes to be sent with this command; the repeat count and delay specifies the number or times this command should be repeated if it fails and the delay before repeating the command; the key, ASC, and ASQ fields define what types of errors can be considered as successful reflashes and store error information if an error has occurred; the command descriptor block ("CDB") length is the number of bytes in the SCSI CDB; the SCSI CDB is the actual SCSI command (such as Write Buffer, Start, Stop, etc.) for the disk drive; and the controller command is the actual command for the disk drive controller (such as an instruction to cause a SCSI bus reset, a time delay, etc). On other types of drives (SATA drives, for example), instructions to the drives would be in the form of SATA instructions.

Figure 5:
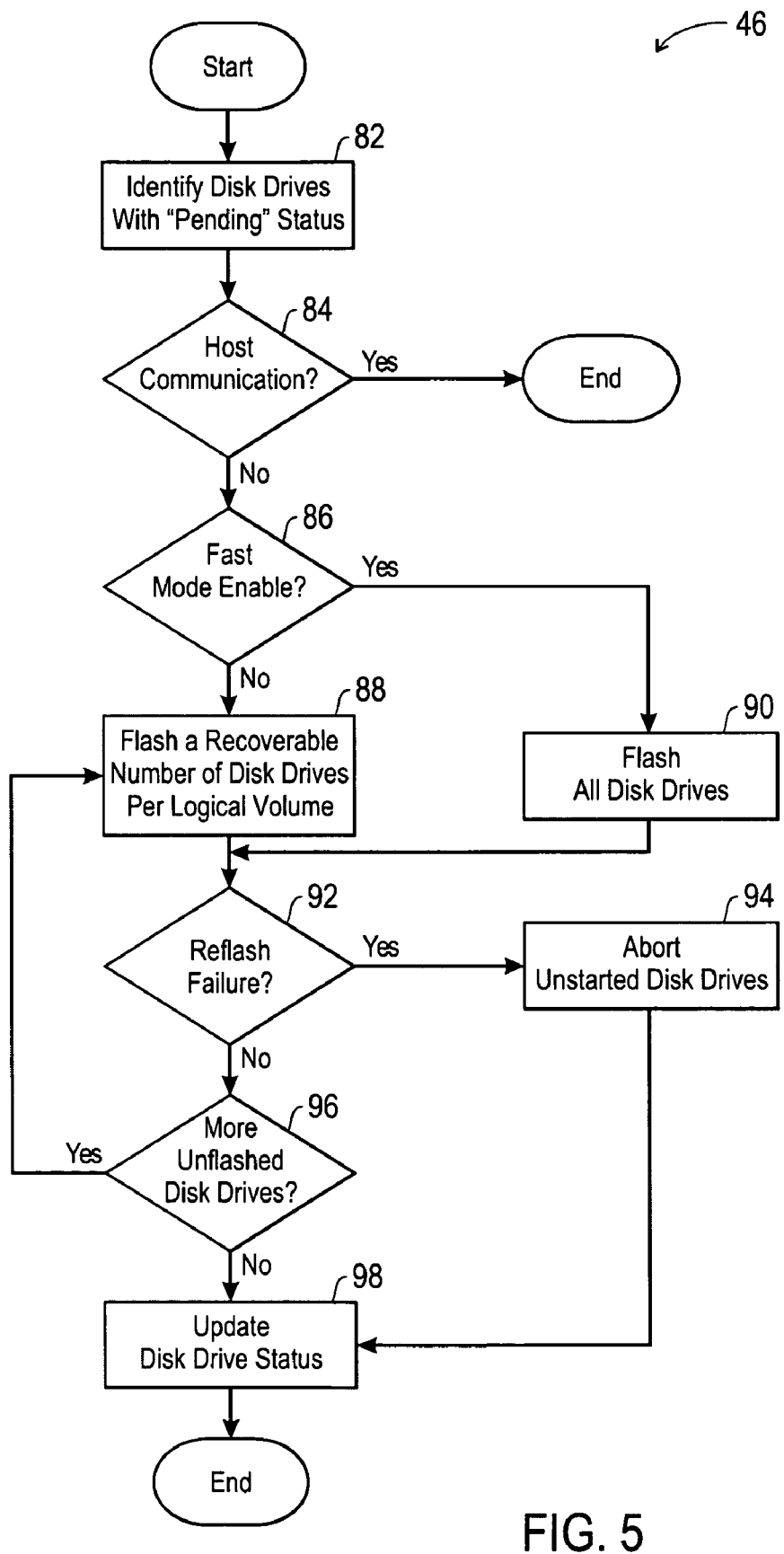
FIG. 5 is a more detailed flow chart illustrating an exemplary technique for executing a deferred firmware update request on a disk drive in accordance with an exemplary embodiment of the present invention.

Turning back to the figures, as described above in regard to FIG. 2, the disk drive controller 16 may be configured to update the disk drives 20 using the upgrade requests packages 74 stored on the disk drives 20. FIG. 5 is a more detailed chart illustrating the exemplary techniques 46 (introduced above in regard to FIG. 2) for executing a deferred firmware update request on a disk drive in accordance with one embodiment. Those of ordinary skill in the art will appreciate that the reflashing process is termed a "deferred firmware update request," because the reflashing process itself may be deferred until the next time that computer system 10 is rebooted. In one embodiment, the disk drive controller 16 is configured to perform the technique 46 to reflash the disk drive firmware 39 within one or more of the disk drives 20 during a reboot or POST of the computer system 10. In an alternate embodiment (not shown), each of the disk drives 20 that contains an update request package that indicates a "pending" status may be configured to automatically reflash its own disk drive firmware 39.

Turning now to the technique 46 itself, the disk drive controller 16 may first identify the disk drives among the plurality of disk drives 20 that have a "pending" status, as indicated in block 82. Once the disk drives with a "pending" status have been identified, the disk drive controller 16 may determine whether the host computer 12 is communicating with any of the plurality of drives 20, as indicated in block 84. As described above, the POST operations of the host computer 12 should be paused during the reflashing process. However, if the host computer 12 is communicating or attempting to communicate with any of the plurality of drives 20, the technique 46 may be configured to end the reflashing process to prevent communication from the host computer 12 from adversely affecting the reflashing process (e.g., from corrupting one of the disk drives 20). While not illustrated in FIG. 5, in one embodiment, the disk drive controller 16 may also be configured to update the status fields within the header 75 to indicate that the update process was stopped due to communications from the host computer 12.

Returning to FIG. 5, if the host computer 12 is not communicating with the disk drives 20, the disk drive controller 16 may next determine whether a fast mode of reflashing has been enabled. In one embodiment, a user may set a flag on the disk drive controller 16 to either enable or disable fast mode reflashing. Fast mode reflashing enables the disk drive controller 16 to reflash multiple disk drives simultaneously without regard for preserving data if one or more of the disk drives 20 fails during the reflashing process. For example, if the plurality of disk drives 20 is configured as a RAID that enables full data recovery if one disk drive is permanently disabled, with fast mode disabled, the disk drive controller 16 would only reflash one disk drive at one time, as indicated by block 88. In other words, with fast mode disabled, the disk drive controller 16 reflashes a recoverable number of disk drives 20 at one time, such that the information stored on the disk drive being flashed could be recovered or rebuilt using the information stored on the other disk drives in that particular RAID. In further example, if the plurality of disk drives 20 is configured as a RAID 6 (also referred to as Advanced Data Guarding or "ADG" configuration), the disk drive controller 16 may be configured to reflash two disk drives from each RAID set simultaneously with fast mode disabled, because RAID 6 provides full data recovery with two disabled disk drives. In still another example, if the plurality of disk drives 20 is configured as a RAID 0, the disk drive controller 16 may reflash all of the drives concurrently whether fast mode is enabled or not, because RAID 0 does not provide for data recovery.

On the other hand, if the fast mode is enabled, the disk drive controller 16 may be configured to flash all of the disk drives 20 simultaneously, as indicated in block 90. With fast mode enabled, the disk drive controller 16 may be able to reflashes tens, hundreds, or even more disk drive simultaneously. In an alternate embodiment not shown in FIG. 5, the disk drive controller may also be configured to reflash more than a recoverable number of disk drives at one time, but less than all of the disk drives 20. For example, in one embodiment, a user of the host computer 12 may be able to select, increase, or decrease the number of disk drives that are simultaneously reflashed. Further, in one embodiment, the disk drive controller 16 may stagger the reflash starting times to limit the number of disk drive that are "spinning up" at one time. By staggering the number of drives that are spinning up simultaneously, the disk drive controller can reduce the instantaneous power used, which may reduce the chances of a power supply overload. Moreover, in one embodiment, this staggering may occur even when fast mode is enabled.

Returning again to FIG. 5, the disk drive controller 16 may configured to monitor the reflashing process for failures, as indicated by block 92. If a reflash failure is detected, the disk drive controller 16 may be configured to abort all unstarted disk drive reflashing to prevent additional failures, as indicated in block 94. On the other hand, if the disk drive controller 16 does not detect any reflash failures, the reflashing process may continue to the remaining unflashed disk drives within the plurality of disk drives 20 that have an update pending as indicated in block 96. In an alternate embodiment, the disk drive controller may employ the update request package 74 stored on one of the disk drives 20 to reflash other disk drives 20 that qualify for the same update request package.

Once the update process has either completed or been aborted, the disk drive controller 16 may update the status field within the update request package 74 stored on each of the disk drives 20 with status information. For example, the disk drive controller 16 may update the status field to indicate a successful reflash, a failure, a reflash abort, or a reflash deferral as described further below. After the status information has been updated, the host computer 12 may resume POST operations, finish the booting process, and then resume normal operations.

As mentioned above, in one embodiment, a user of the host computer 12 or the host computer 12 itself may have some measure of control over the reflashing process. For example, the host computer may execute instructions that enable the host computer 12 to communicate or control the disk drive controller 16. These instructions may be stored on the option ROM 34 and copied into the host RAM 26 as the host computer 12 boots up. In one embodiment, these instructions enable a user of the host computer (or the host computer 12 itself) to abort the reflashing process completely, pause the reflashing process, or to defer the reflashing process until a subsequent reboot. In another embodiment, these instructions may enable the user to increase or decrease the number disk drives that are simultaneously reflashed. In other words, the user may be able to speed-up or slow-down the reflashing process. In still another embodiment, the host computer 12 may execute option ROM instructions that enable the host computer 12 to display a reflash completion percentage and/or an estimate time remaining to finish reflashing the disk drives 20.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed:

1. A method comprising:
    storing a firmware flash image in a storage area on a first disk drive;
    initiating power-on self test operations for the computer; and
    reflashing firmware associated with a second disk drive using the firmware flash image stored on the first disk drive, wherein the reflashing occurs during the power-on self test operations.

2. The method, as set forth in claim 1, comprising storing instructions for reflashing the firmware in the storage area on the first disk drive, wherein the instructions are employed to reflash of the firmware on the second disk drive.

3. The method, as set forth in claim 1, comprising storing data indicative of a pending status in the storage area on the first disk drive, wherein the firmware of the second disk drive is only reflashed if the data indicative of the pending status is stored in the storage area on the first disk drive.

4. The method, as set forth in claim 1, comprising storing a status indicator indicative of the result of the reflashing in the storage area on the first or second disk drive.

5. The method, as set forth in claim 4, wherein storing the status indicator comprises storing at least one of a completed, aborted, deferred, or failed status indicator.

6. The method, as set forth in claim 1, wherein storing the firmware flash image on the storage area comprises storing the firmware flash image on the storage area of a hard disk drive.

7. The method, as set forth in claim 1, wherein reflashing firmware associated with the second disk drive comprises reflashing firmware of the second disk drive if the second disk drive that qualifies to be reflashed with the firmware flash image stored in the storage area.

8. A computer system comprising:
a disk drive comprising firmware configured to be reflashed;
a host computer coupled to the disk drive and configured to copy an update request package to the disk drive before a reboot, wherein the update request package comprises a firmware flash image and instructions for the disk drive controller to follow to reflash the firmware; and
a disk drive controller coupled to the host computer and the disk drive, wherein the disk drive controller is configured to reflash the firmware using the update request package while the host computer is rebooted.

9. The computer system, as set forth in claim 8, wherein using the update request package comprises copying the firmware flash image to a ROM and following the instructions for the disk drive controller to use to reflash the firmware.

10. The computer system, as set forth in claim 8, wherein the disk drive comprises a redundant array of inexpensive disks ("RAID") coupled to the disk drive controller.

11. The computer system, as set forth in claim 10, wherein the disk drive controller comprises a RAID controller and wherein the RAID controller is configured to reflash one disk drive from the RAID at a time.

12. The computer system, as set forth in claim 8, wherein the disk drive controller comprises an option ROM that contains instructions that when executed enable a user to abort or defer the reflashing of the firmware.

13. The computer system, as set forth in claim 8, wherein the host computer is configured to determine whether the disk drive qualifies based on a predetermined qualifying criteria before copying the update request package to the disk drive.

14. The computer system, as set forth in claim 8, wherein the host computer is configured to stored a pending indicator on the disk drive and wherein the disk drive controller is configured to only reflash disk drives that contain the pending indicator.

15. A method comprising:
identifying a subset of disk drives with a pending status from amongst a plurality of disk drives;
determining whether fast mode reflashing is enabled;
if fast mode reflashing is enabled, simultaneously reflashing all of the disk drives from the subset of disk drives; and
if the fast mode reflashing in not enabled, simultaneously reflashing a recoverable number of disk drives from the subset of disk drives.

16. The method, as set forth in claim 15, wherein simultaneously reflashing a recoverable number of disk drives comprises reflashing one disk drive per RAID 5 set.

17. The method, as set forth in claim 15, wherein simultaneously reflashing a recoverable number of disk drives comprises reflashing two disk drives per RAID 6 set.

18. The method, as set forth in claim 15, comprising aborting the reflashing if a reflashing failure is detected.

19. The method, as set forth in claim 15, comprising updating a status indicator to indicate the success or failure of the reflashing.

20. The method, as set forth in claim 15, wherein reflashing a recoverable number of disk drives from the subset of disk drives comprises reflashing each of a recoverable number of disk drives using a firmware flash image stored on a storage area of each of the disk drives.

21. A hard disk drive comprising:
a processor;
a read-only memory storing firmware; and
a disk having a storage area configured to store a firmware flash image and instructions for the processor to follow to reflash the firmware, wherein the processor is configured to use the stored firmware flash image to reflash the firmware on the read-only memory according to the stored instructions.

22. The hard disk drive, as set forth in claim 21, wherein the processor is configured to reflash the firmware after the hard disk drive is restarted.

23. A method comprising:
storing a firmware flash image in a storage area on a plurality of disk drives;
initiating power-on self test operations for a computer associated with the plurality of disk drives; and
reflashing firmware associated with the plurality of disk drives using the firmware flash image stored in the storage area, wherein the reflashing occurs during the power-on self test operations, and wherein each one of the plurality of disk drives begins the reflashing at different starting times.

24. The method, as set forth in claim 23, comprising storing instructions for reflashing the firmware in the storage area on the plurality of disk drives, wherein the instructions are employed to reflash of the firmware.

* * * * *

UNITED STATES PATENT AND TRADEMARK OFFICE
CERTIFICATE OF CORRECTION

PATENT NO.         : 7,426,633 B2                                    Page 1 of 1
APPLICATION NO. : 11/127650
DATED              : September 16, 2008
INVENTOR(S)        : Mark J. Thompson et al.

It is certified that error appears in the above-identified patent and that said Letters Patent is hereby corrected as shown below:

In column 11, line 8, in Claim 7, after "drive" delete "that".

Signed and Sealed this

Eighth Day of September, 2009

David J. Kappos
*Director of the United States Patent and Trademark Office*